(12) United States Patent
Sun et al.

(10) Patent No.: US 11,345,864 B1
(45) Date of Patent: May 31, 2022

(54) SYSTEMS AND METHODS FOR UPGRADING PYROLYSIS OIL TO LIGHT AROMATICS OVER MIXED METAL OXIDE CATALYSTS

(71) Applicant: Saudi Arabian Oil Company, Dhahran (SA)

(72) Inventors: Miao Sun, Dhahran (SA); Noor Al-Mana, Dhahran (SA); Sohel K Shaikh, Dhahran (SA); Zhonglin Zhang, Dhahran (SA); Fahad A. Almalki, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/167,489

(22) Filed: Feb. 4, 2021

(51) Int. Cl.
*C10G 47/04* (2006.01)
*C10G 31/10* (2006.01)

(52) U.S. Cl.
CPC ............ *C10G 47/04* (2013.01); *C10G 31/10* (2013.01); *C10G 2300/1096* (2013.01);
(Continued)

(58) Field of Classification Search
CPC ........ C10G 47/04; C10G 31/10; C10G 69/06; C10G 2300/701; C10G 2300/1096;
(Continued)

(56) References Cited

U.S. PATENT DOCUMENTS

| 3,099,617 A | * | 7/1963 | Tulleners | ............... C10G 47/06 208/109 |
| 4,550,090 A | * | 10/1985 | Degnan | .................... B01J 29/90 208/111.15 |

(Continued)

FOREIGN PATENT DOCUMENTS

| CN | 104355995 A | 2/2015 |
| CN | 106622354 A | 5/2017 |

(Continued)

OTHER PUBLICATIONS

Notice of Allowance and Fee(s) Due dated Apr. 9, 2021 pertaining to U.S. Appl. No. 16/916,234, filed Jun. 30, 2020, 20 pgs.
(Continued)

*Primary Examiner* — Michelle Stein
(74) *Attorney, Agent, or Firm* — Dinsmore & Shohl LLP

(57) ABSTRACT

A system for upgrading pyrolysis oil may include a pyrolysis upgrading unit having a mixed metal oxide catalyst and a separation unit operable to separate used mixed metal oxide catalyst from a reaction effluent. A method for upgrading pyrolysis oil may include contacting the pyrolysis oil with hydrogen in the presence of the mixed metal oxide catalyst at reaction conditions to produce a reaction effluent. The pyrolysis oil may include multi-ring aromatic compounds. The mixed metal oxide catalyst may include a plurality of catalyst particles and each of the plurality of catalyst particles having a plurality of metal oxides. Contacting the pyrolysis oil with hydrogen in the presence of the mixed metal oxide catalyst at the reaction conditions may convert at least a portion of the multi-ring aromatic compounds in the pyrolysis oil to the light aromatic compounds.

17 Claims, 2 Drawing Sheets

(52) U.S. Cl.
CPC ............... C10G 2300/4006 (2013.01); C10G 2300/4012 (2013.01); C10G 2300/4025 (2013.01); C10G 2300/701 (2013.01); C10G 2300/802 (2013.01); C10G 2400/30 (2013.01)

(58) Field of Classification Search
CPC ...... C10G 2300/4006; C10G 2300/802; C10G 2300/4012; C10G 2300/4025; C10G 2400/30
See application file for complete search history.

(56) References Cited

U.S. PATENT DOCUMENTS

| | | | | |
|---|---|---|---|---|
| 4,602,000 | A | * | 7/1986 | Dupin ................ B01J 21/04 502/314 |
| 6,531,051 | B1 | | 3/2003 | Kasztelan et al. |
| 7,232,515 | B1 | * | 6/2007 | Demmin .............. B01J 23/002 208/213 |
| 9,217,114 | B2 | | 12/2015 | Cortright et al. |
| 9,321,973 | B2 | | 4/2016 | Marchand et al. |
| 10,118,163 | B1 | | 11/2018 | Zhang |
| 2005/0070423 | A1 | | 3/2005 | Kishan et al. |
| 2009/0171123 | A1 | | 7/2009 | Glaser et al. |
| 2009/0173666 | A1 | * | 7/2009 | Zhou ................. C10G 47/26 208/112 |
| 2009/0314683 | A1 | * | 12/2009 | Matsushita ........... C10G 47/12 208/111.3 |
| 2009/0321315 | A1 | * | 12/2009 | Bhattacharyya ....... C10G 47/26 208/112 |
| 2010/0314295 | A1 | * | 12/2010 | Sandstede ............ B01J 23/888 208/143 |
| 2012/0094879 | A1 | * | 4/2012 | Roberts ................ C10G 3/42 508/459 |
| 2012/0238792 | A1 | | 9/2012 | Watson et al. |
| 2013/0143972 | A1 | | 6/2013 | Townsend et al. |
| 2013/0164205 | A1 | | 6/2013 | Putluru et al. |
| 2013/0178664 | A1 | | 7/2013 | Zhou et al. |
| 2013/0245338 | A1 | | 9/2013 | Weiner et al. |
| 2014/0021096 | A1 | | 1/2014 | Chaumonnot et al. |
| 2014/0027346 | A1 | | 1/2014 | Chaumonnot et al. |
| 2014/0130402 | A1 | * | 5/2014 | Kastner ................. C10G 1/002 44/386 |
| 2015/0231615 | A1 | | 8/2015 | Bonduelle et al. |
| 2015/0274620 | A1 | | 10/2015 | Zong et al. |
| 2017/0001180 | A1 | | 1/2017 | Ravishankar et al. |
| 2017/0100710 | A1 | | 4/2017 | Kim et al. |
| 2018/0142159 | A1 | | 5/2018 | Kumar et al. |
| 2018/0290131 | A1 | | 10/2018 | Carrette |
| 2018/0333708 | A1 | | 11/2018 | Ding et al. |
| 2018/0334622 | A1 | * | 11/2018 | Agrawal ............... C10G 65/04 |
| 2019/0134616 | A1 | | 5/2019 | Jae et al. |
| 2021/0130715 | A1 | * | 5/2021 | Xu ..................... C10G 69/06 |

FOREIGN PATENT DOCUMENTS

| | | | | |
|---|---|---|---|---|
| FR | 3075663 | A1 | 6/2019 | |
| WO | WO-0042127 | A1 | * 7/2000 | ............... C08F 8/04 |
| WO | 2012085358 | A1 | 6/2012 | |
| WO | 2017207976 | A1 | 12/2017 | |
| WO | WO-2017207976 | A1 | * 12/2017 | ............. C10G 45/12 |
| WO | WO-2018011642 | A1 | * 1/2018 | ............. C10G 45/08 |
| WO | WO-2019197987 | A1 | * 10/2019 | ............ B01J 27/186 |

OTHER PUBLICATIONS

Guerzoni et al. "Catalytic Cracking of a Hydrocarbon Mixture on Combinations of HY and HZSM-5 Zeolites" Chemistry Department, Journal of Catalysis 139, 289-303 (1993), 15 pgs.
Hanif et al. "Supported solid and heteropoly acid catalysts for production of biodiesel" Catalysis Reviews (2017) vol. 69, No. 2, 165-188, 24 pgs.
Jimenez-Cruz et al. "Molecular size evaluation of linear and branched paraffins from the gasoline pool by DFT quantum chemical calculations" Science Direct, Fuel 83 (2004) 2183-2188, 7 pgs.
Kim et al. "Novel Ni2P/zeolite catalysts for naphthalene hydrocracking to BTX" Catalysis Communications 45 (2014) 133-138, 6 pgs.
Kim et al. "Morphology effect of b-zeolite supports for Ni2P catalysts on the hydrocracking of polycyclic aromatic hydrocarbons to benzene, toluene, and xylene" Journal of Catalysis 351 (2017) 67-78, 12 pgs.
Lapinas et al. "Catalytic Hydrogenation and Hydrocracking of Fluorene: Reaction Pathways, Kinetics, and Mechanisms" Ind. Eng. Chem. Res. 1991, 30, 42-50, 9 pgs.
Leite et al. "Hydrocracking of phenanthrene over bifunctional Pt catalysts" Catalysis Today 65 (2001) 241-247, 7 pgs.
Lemberton et al. "Catalytic hydroconversion of simulated coal tars" Applied Catalysis A: General, 79 (1991) 115-126, 12 pgs.
Matsui et al. "Explanation of Product Distribution of Hydrocracking Reaction of Aromatic Hydrocarbons with Nickel-Loaded Zeolites Based on CAMD Study on Interaction between Zeolites and Substrates" Energy & Fuels (1995) 9, 435-438, 4 pgs.
Okuhara et al. "Catalytic Chemistry of Heteropoly Compounds" Advances in Catalysis, Adv Cata vol. 41 (1996) 113, 140 pgs.
Park et al. "Mild hydrocracking of 1-methyl naphthalene (1-MN) over alumina modified zeolite" Journal of Industrial and Engineering Chemistry 19 (2013) 627-632, 6 pgs.
Tailleur et al. The effect of aromatics on paraffin mild hydrocracking reactions (WNiPd/CeY—Al2O3), Fuel Processing Technology 89 (2008) 808-818, 11 pgs.
Upare et al. "Cobalt promoted Mo/beta zeolite for selective hydrocracking of tetralin and pyrolysis fuel oil into monocyclic aromatic hydrocarbons" Journal of Industrial and Engineering Chemistry 35 (2016) 99-107, 9 pgs.
Upare et al. "Selective hydrocracking of pyrolysis fuel oil into benzene, toluene and xylene over CoMo/beta zeolite catalyst" Journal of Industrial and Engineering Chemistry 46 (2017) 356-363, 8 pgs.
Park et al. "Hydro-conversion of 1-methyl naphthalene into (alkyl)benzenes over alumina-coated USY zeolite-supported NiMoS catalysts" Fuel 90 (2011) 182-189, 8 pgs.
Office Action dated Jan. 6, 2020 pertaining to U.S. Appl. No. 16/502,633, filed Jul. 3, 2019, 19 pgs.
Wang, et al., "Performance Evaluation of "Ship-In-The-Bottle" Type Heteropoly Acid Encaged V-Type Zeolite as Catalyst for Oxidative Desulfurization", collect. Czech, commun. 2011, vol. 76, No. 12, pp. 1595-1605.
Notice of Allowance dated Mar. 2, 2020 pertaining to U.S. Appl. No. 16/502,601, filed Jul. 3, 2019 (SA6290PA).
Notice of Allowance dated Mar. 11, 2020 pertaining to U.S. Appl. No. 16/502,633, filed Jul. 3, 2019 (SA6291 Pa).
Pasoni et al., "Heterogenization of H6PMo9V3O40 and palladium acteate in VPI-5 and MCM-41 and their use in the catalytic oxidation of benzene to phenol", Journal of Molecular Catalyst A: Chemical 134 (1998), pp. 229-235.
Technical Data Sheet, ACS Material Al-MCM-41, www.acsmaterial. com, no date available.
Kumar et al., "MCM-41, MCM-48 and related mesoporous adsorbents: their synthesis and characterization", Colloids and Surfaces A: Physicochemical and Engineering Aspects 187-188 (2001), pp. 109-116.
Office Action dated Dec. 23, 2019 pertaining to U.S. Appl. No. 16/502,601, filed Jul. 3, 2019, 16 pgs.
International Search Report and Written Opinion dated Apr. 14, 2020 pertaining to International application No. PCT/US2019/068539 filed Dec. 26, 2019.
Notice of Allowance and Fee(s) Due dated Apr. 16, 2020 pertaining to U.S. Appl. No. 16/807,980, filed Mar. 3, 2020, 15 pgs.
Notice of Allowance and Fee(s) Due dated Apr. 16, 2020 pertaining to U.S. Appl. No. 16/807,433, filed Mar. 3, 2020, 15 pgs.
Office Action dated May 11, 2020 pertaining to U.S. Appl. No. 16/807,451, filed Mar. 3, 2020, 26 pgs.
Office Action dated May 8, 2020 pertaining to U.S. Appl. No. 16/807,971, filed Mar. 3, 2020, 21 pgs.
Office Action dated May 20, 2020 pertaining to U.S. Appl. No. 16/502,633, filed Jul. 3, 2029, 12 pgs.

(56) References Cited

OTHER PUBLICATIONS

Martinez-Franco et al., "Hiigh-silica nanocrystalline Beta zeolites: efficient synthesis and catalytic application", Chem. Sci., 2016, 7, pp. 102-108.
International Search Report and Written Opinion dated May 27, 2020 pertaining to International application No. PCT/US2020/019620 filed Feb. 25, 2020, 15 pgs.
Notice of Allowance and Fee(s) Due dated Jul. 16, 2020 pertaining to U.S. Appl. No. 16/807,971, filed Mar. 3, 2020, 16 pgs.
Office Action dated Jul. 10, 2020 pertaining to U.S. Appl. No. 16/502,601, filed Jul. 3, 2019, 8 pgs.
U.S. Notice of Allowance and Fee(s) due dated Aug. 19, 2020 pertaining to U.S. Appl. No. 16/807,451, filed Mar. 3, 2020, 20 pgs.
Office Action dated Nov. 9, 2020 pertaining to U.S. Appl. No. 16/916,234, filed Jun. 30, 2020, 30 pgs.
Office Action dated Nov. 9, 2020 pertaining to U.S. Appl. No. 16/502,633, filed Jul. 3, 2019, 16 pgs.
Nikulshin et al. "CoMo/Al2O3 catalysts prepared on the basis of Co2Mo10-heteropolyacid and cobalt citrate: Effect of Co/Mo ratio", Fuel, vol. 100, Oct. 2012, pp. 24-33.
Office Action dated Nov. 19, 2020 pertaining to U.S. Appl. No. 16/909,114, filed Jun. 23, 2020, 24 pgs.
Notice of Allowance and Fee(s) Due dated Nov. 12, 2020 pertaining to U.S. Appl. No. 16/502,601, filed Jul. 3, 2019, 16 pgs.
Office Action dated Feb. 10, 2020 pertaining to U.S. Appl. No. 16/502,633, filed Jul. 3, 2019, 12 pgs.
Kondoh et al., "Catalytic cracking of heavy oil over TiO2—ZrO2 catalysts under superheated steam conditions", Fuel, vol. 167, pp. 268-294, 2016.
Kondoh et al., "Effects of H2O Addition on Oil Sand Bitumen Cracking Using a CeO2—ZrO2—Al2O3—FeOx Catalyst", Energy Fuels, vol. 30, pp. 10358-10364, 2016.
Kondoh et al., "Upgrading of oil sand bitumen over an iron oxide catalyst using sub- and super-critical water", Fuel Processing Technology, vol. 145, pp. 96-101, 2016.

* cited by examiner

SYSTEMS AND METHODS FOR UPGRADING PYROLYSIS OIL TO LIGHT AROMATICS OVER MIXED METAL OXIDE CATALYSTS

BACKGROUND

Field

The present disclosure generally relates to systems and methods for upgrading hydrocarbons, more specifically, systems and methods for upgrading pyrolysis oil to light aromatic compounds over mixed metal oxide catalysts.

Technical Background

Crude oil can be converted to valuable chemical intermediates and products through one or more hydrotreating processes. The hydrotreating processes can include steam cracking, in which larger hydrocarbons in the crude oil are cracked to form smaller hydrocarbons. Steam cracking units produce a bottom stream, which is referred to as pyrolysis oil. The pyrolysis oil may include an increased concentration of aromatic compounds compared to the crude oil feedstock. In many crude oil processing facilities, this pyrolysis oil is burned as fuel. However, the aromatic compounds in the pyrolysis oil can be converted to greater value chemical products and intermediates, which can be used as building blocks in chemical synthesis processes. For example, aromatic compounds from the pyrolysis oil can be converted into xylenes, which can be the initial building blocks for producing terephthalic acid, which can then be used to produce polyesters. The aromatic compounds in the pyrolysis oil can be upgraded to many other greater value aromatic products and intermediates. The market demand for these greater value aromatic compounds continues to grow.

SUMMARY

Pyrolysis oils from steam cracking processes can be upgraded to produce greater value products and intermediates by contacting the pyrolysis oil with catalysts operable to convert multi-ring aromatic compounds in the pyrolysis oil to one or more light aromatic compounds, which can include benzene, toluene, ethylbenzene, xylenes, other aromatic compounds, or combinations of these. Existing catalysts operable to upgrade pyrolysis oil can include multi-metal hydrocracking catalysts that have two or more metals supported on a catalyst support. These multi-metal hydrocracking catalysts are typically prepared from conventional metal precursors, such as metallate hydrates, metal nitrates, and other conventional metal precursors impregnated onto the microporous catalyst supports.

These conventional multi-metal hydrocracking catalysts may be prepared using zeolite supports, which may generally be microporous having an average pore size of less than about 2 nanometers (nm). However, the multi-ring aromatic compounds present in pyrolysis oil may have molecular sizes that are larger than the average pore size of zeolite supports used to prepare these conventional multi-metal catalysts. Thus, the small average pore size of the nanoporous zeolites may restrict access of the larger multi-ring aromatic compounds to reactive sites within the pores of the zeolite support, thus, reducing the yield and conversion attainable with these existing multi-metal hydrocracking catalysts.

Accordingly, ongoing needs exist for improved catalysts for upgrading pyrolysis oils to produce light aromatic compounds. The present disclosure is directed to systems for upgrading pyrolysis oil that include mixed metal oxide catalysts. The present disclosure is also directed to methods of upgrading pyrolysis oil using mixed metal oxide catalysts. The mixed metal oxide catalysts of the present disclosure may include a plurality of catalyst particles, and each of the plurality of catalyst particles may comprise a plurality of metal oxides. The mixed metal oxide catalysts of the present disclosure may convert a portion of the multi-ring aromatic compounds in the pyrolysis oil to light aromatic compounds in a single step, without conducting a subsequent chemical reaction step. The systems and methods may also produce greater yields of light aromatic compounds from upgrading pyrolysis oil compared to upgrading pyrolysis oil using existing multi-metal hydrocracking catalysts.

According to one or more aspects of the present disclosure, a method for upgrading pyrolysis oil may include contacting the pyrolysis oil with hydrogen in the presence of a mixed metal oxide catalyst at reaction conditions to produce a reaction effluent comprising light aromatic compounds. The pyrolysis oil may include multi-ring aromatic compounds. The mixed metal oxide catalyst may include a plurality of catalyst particles and each of the plurality of catalyst particles may include a plurality of metal oxides. Contacting the pyrolysis oil with hydrogen in the presence of the mixed metal oxide catalyst at the reaction conditions may convert at least a portion of the multi-ring aromatic compounds in the pyrolysis oil to the light aromatic compounds.

According to one or more other aspects of the present disclosure, a system for upgrading pyrolysis oil may include a pyrolysis upgrading unit and a separation unit. The pyrolysis upgrading unit may include a mixed metal oxide catalyst. The mixed metal oxide catalyst may include a plurality of catalyst particles and each of the plurality of catalyst particles may include a plurality of metal oxides. The pyrolysis upgrading unit may be operable to contact the pyrolysis oil with hydrogen in the presence of the mixed metal oxide catalyst to produce a reaction effluent. The separation unit may be disposed downstream of the pyrolysis upgrading unit and may be operable to separate used mixed metal oxide catalyst from the reaction effluent to produce a reaction product comprising light aromatic compounds.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
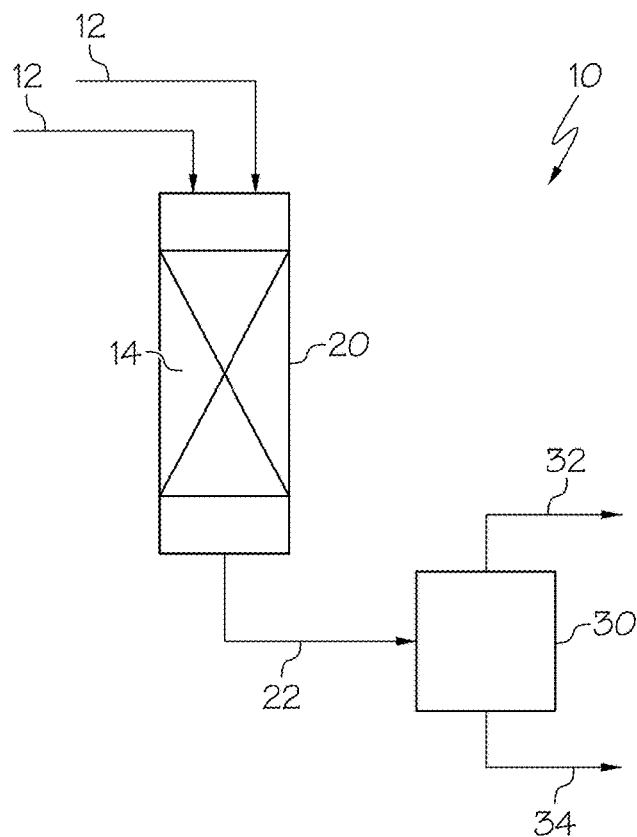
FIG. 1 schematically depicts a generalized flow diagram of a system for upgrading a pyrolysis oil, according to one or more embodiments shown and described in this disclosure.
Figure 3:
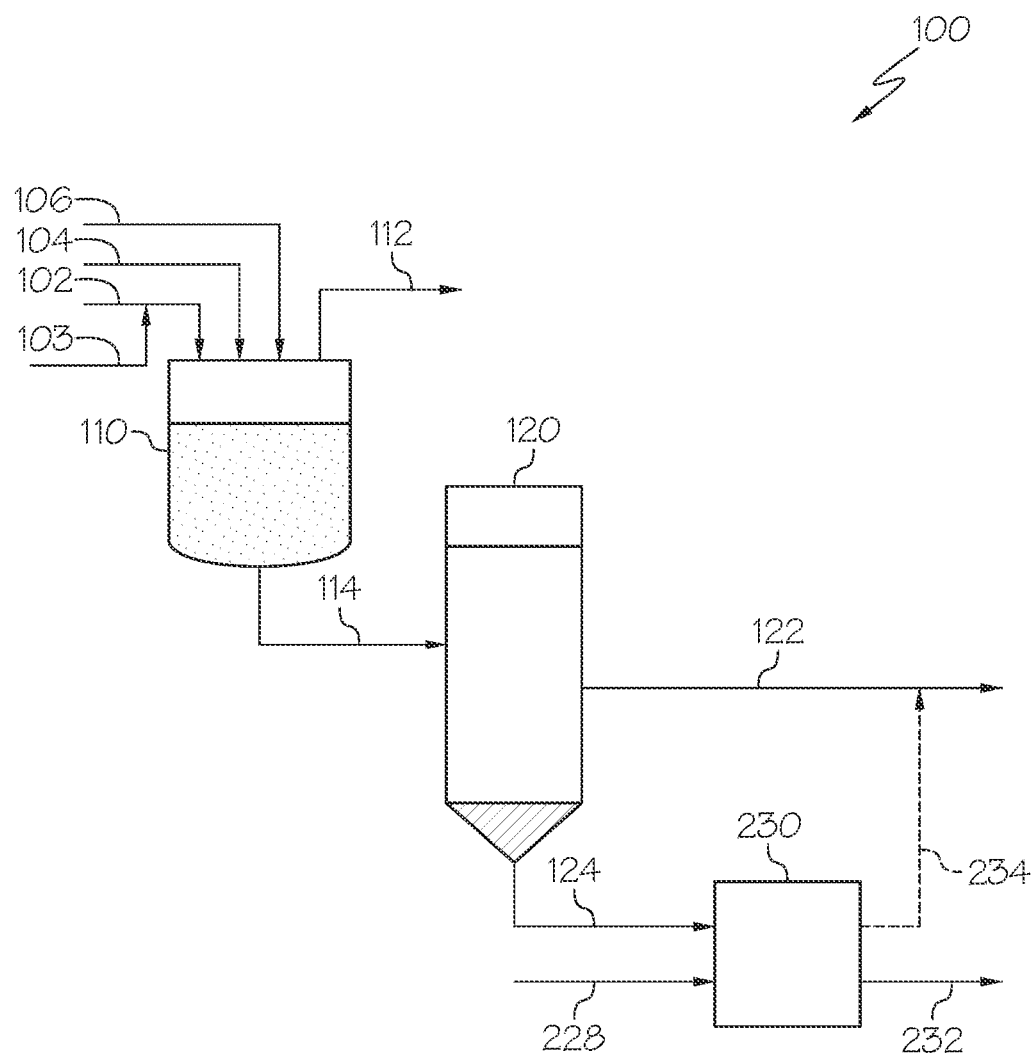
FIG. 3 schematically depicts a generalized flow diagram of another system for upgrading a pyrolysis oil, including washing a used mixed metal oxide catalyst, according to one or more embodiments shown and described in this disclosure.

For the purpose of describing the simplified schematic illustrations and descriptions of FIGS. 1 and 3, the numerous valves, temperature sensors, electronic controllers, and the like that may be employed and well known to those of ordinary skill in the art of certain chemical processing operations are not included. Further, accompanying components that are often included in chemical processing operations, such as, for example, air supplies, heat exchangers, surge tanks, catalyst hoppers, or other related systems are not depicted. It would be known that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines that may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows that do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that two or more process streams are "mixed" or "combined" when two or more lines intersect in the schematic flow diagrams of FIGS. 1 and 3. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to systems and methods for upgrading pyrolysis oil. Referring now to FIG. 1, one embodiment of a system 100 of the present disclosure for upgrading pyrolysis oil 102 is schematically depicted. The systems 100 for upgrading pyrolysis oil 102 may comprise a pyrolysis upgrading unit 110 and a separation unit 120 disposed downstream of the pyrolysis upgrading unit 110. The pyrolysis upgrading unit 110 may include a mixed metal oxide catalyst 106 comprising a plurality of catalyst particles and each of the plurality of catalyst particles comprises a plurality of metal oxides. The pyrolysis upgrading unit 110 may be operable to contact the pyrolysis oil 102 with hydrogen 104 in the presence of the mixed metal oxide catalyst 106 to produce a reaction effluent 114. The separation unit 120 disposed downstream of the pyrolysis upgrading unit 110 may be operable to separate used mixed metal oxide catalyst 124 from the reaction effluent 114 to produce a reaction product effluent 122 comprising light aromatic compounds. The present disclosure is also directed to methods for upgrading pyrolysis oil 102. In particular, the methods may comprise contacting the pyrolysis oil 102 with hydrogen 104 in the presence of a mixed metal oxide catalyst 106 at reaction conditions to produce a reaction effluent 114 comprising light aromatic compounds.

The various systems and methods of the present disclosure for upgrading pyrolysis oil may convert the pyrolysis oil to light aromatics in a single step. Traditionally, pyrolysis oil has not been able to be upgraded to light aromatics in a single step over conventional catalysts, such as conventional multi-metal hydrocracking catalysts. In the systems and methods of the present disclosure, the pyrolysis oil may be contacted with hydrogen in the presence of the mixed metal oxide catalyst to covert multi-ring aromatic compounds in the pyrolysis oil to light aromatics in a single step.

As used in this disclosure, a "catalyst" may refer to any substance that increases the rate of a specific chemical reaction. Catalysts and catalyst components described in this disclosure may be utilized to promote various reactions, such as, but not limited to hydrogenation, ring opening, disproportionation, dealkylation, transalkylation, cracking, aromatic cracking, or combinations of these.

As used in this disclosure, "cracking" may refer to a chemical reaction where a molecule having carbon-carbon bonds is broken into more than one molecule by the breaking of one or more of the carbon-carbon bonds; where a compound including a cyclic moiety, such as an aromatic, is converted to a compound that does not include a cyclic moiety; or where a molecule having carbon-carbon double bonds are reduced to carbon-carbon single bonds. Some catalysts may have multiple forms of catalytic activity, and calling a catalyst by one particular function does not render that catalyst incapable of being catalytically active for other functionality.

As used in this disclosure, the term "aromatic compounds" may refer to one or more compounds having one or more aromatic ring structures. The term "light aromatic compounds" may refer to one or more compounds having an aromatic ring, with or without substitution, and from six to eight carbon atoms. The term "BTEX" may refer to any combination of benzene, toluene, ethylbenzene, para-xylene, meta-xylene, and ortho-xylene.

As used throughout the present disclosure, the term "crude oil" or "whole crude oil" may refer to crude oil received directly from an oil field or from a desalting unit without having any fraction separated by distillation.

As used throughout the present disclosure, the terms "upstream" and "downstream" may refer to the relative positioning of unit operations with respect to the direction of flow of the process streams. A first unit operation of a system may be considered "upstream" of a second unit operation if process streams flowing through the system encounter the first unit operation before encountering the second unit operation. Likewise, a second unit operation may be considered "downstream" of the first unit operation if the process streams flowing through the system encounter the first unit operation before encountering the second unit operation.

As used in the present disclosure, passing a stream or effluent from one unit "directly" to another unit may refer to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent. Combining two streams or effluents together upstream of a process unit also is not considered to comprise an intervening system that changes the composition of one or both of the streams or effluents being combined. Simply dividing a stream into two streams having the same composition is also not considered to comprise an intervening system that changes the composition of the stream.

As used in this disclosure, a "separation unit" refers to any separation device that at least partially separates one or more chemicals that are mixed in a process stream from one another. For example, a separation unit may selectively separate differing chemical species from one another, forming one or more chemical fractions. Examples of separation units include, without limitation, distillation columns, flash drums, knock-out drums, knock-out pots, centrifuges, filtration devices, traps, scrubbers, expansion devices, membranes, solvent extraction devices, and the like. It should be understood that separation processes described in this disclosure may not completely separate all of one chemical consistent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided or separated into two or more process streams of desired composition. Further, in some separation processes, a "light fraction" and a "heavy fraction" may separately exit the separation unit. In general, the light fraction stream has a lesser boiling point than the heavy fraction stream. It should be additionally understood that where only one separation unit is depicted in a figure or described, two or more separation units may be employed to carry out the identical or substantially identical separation. For example, where a distillation column with multiple outlets is described, it is contemplated that several separators arranged in series may equally separate the feed stream and such embodiments are within the scope of the presently described embodiments.

As used in this disclosure, the term "effluent" may refer to a stream that is passed out of a reactor, a reaction zone, or a separation unit following a particular reaction or separation process. Generally, an effluent has a different composition than the stream that entered the separation unit, reactor, or reaction zone. It should be understood that when an effluent is passed to another system unit, only a portion of that system stream may be passed. For example, a slip stream (having the same composition) may carry some of the effluent away, meaning that only a portion of the effluent may enter the downstream system unit. The term "reaction effluent" may more particularly be used to refer to a stream that is passed out of a reactor or reaction zone.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "hydrogen stream" passing to a first system component or from a first system component to a second system component should be understood to equivalently disclose "hydrogen" passing to the first system component or passing from a first system component to a second system component.

Referring again to FIG. 1, a system 100 for upgrading pyrolysis oil 102 is schematically depicted. The system 100 for upgrading pyrolysis oil 102 may include a pyrolysis upgrading unit 110 and a separation unit 120 downstream of the pyrolysis upgrading unit 110. The pyrolysis upgrading unit 110 may include one or a plurality of reactors and may be operable to contact the pyrolysis oil 102 with hydrogen 104 in the presence of a catalyst to produce a reaction effluent 114. The catalyst is the mixed metal oxide catalyst 106 of the present disclosure. The reaction effluent 114 may be passed to the separation unit 120, which may include one or a plurality of separation processes or unit operations. The separation unit 120 may be operable to separate used mixed metal oxide catalyst from the reaction effluent 114 to produce a reaction product effluent 122 and used mixed metal oxide catalyst 124. The reaction product effluent 122 may comprise light aromatic compounds. In particular, the reaction product effluent 122 may comprise toluene, benzene, ethylbenzene, xylenes, or combinations of these.

Figure 2:
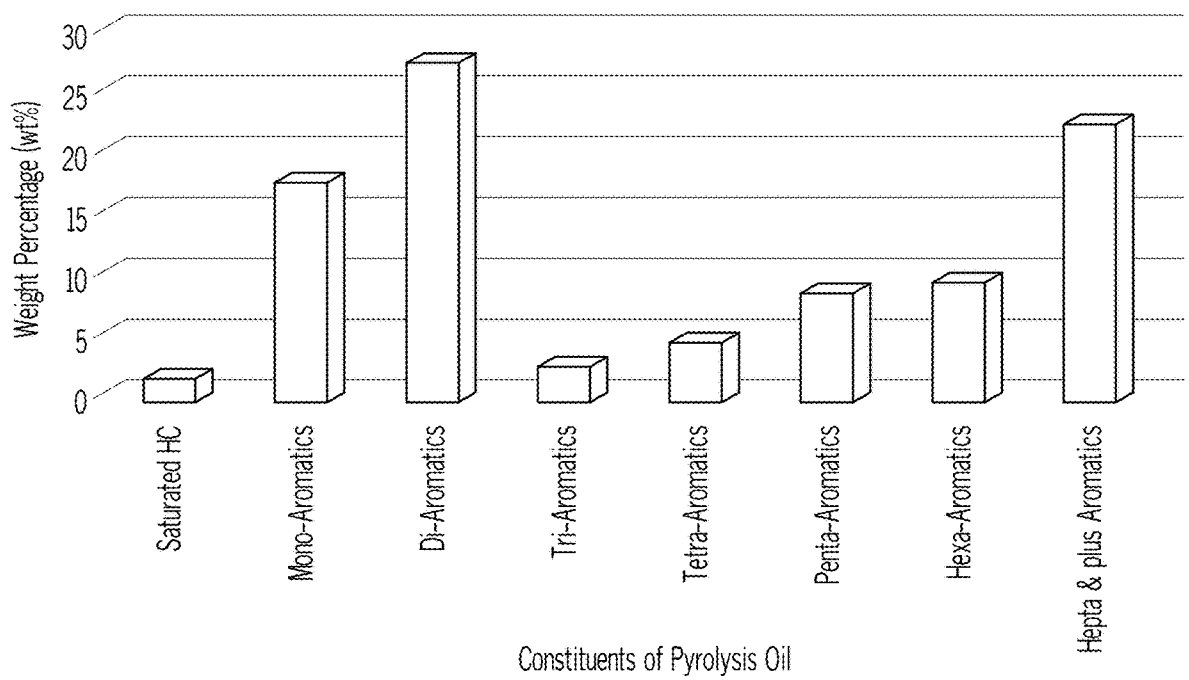
FIG. 2 graphically depicts weight percentage (y-axis) of various constituents (x-axis) present in a pyrolysis oil produced from steam cracking, according to one or more embodiments shown and described in this disclosure.

The pyrolysis oil 102 may be a stream from a hydrocarbon processing facility that is rich in aromatic compounds, such as multi-ring aromatic compounds. In embodiments, the pyrolysis oil 102 may be a bottom stream from a steam cracking process. As used in the present disclosure, "bottom stream" may refer to a residuum or a fraction of the feed (such as the feed to a steam cracking process) including the least volatile constituents that have not been separately captured as condensed vapor. The pyrolysis oil 102 may include mono-aromatic compounds and multi-ring aromatic compounds. Multi-ring aromatic compounds may include aromatic compounds including 2, 3, 4, 5, 6, 7, 8, or more than 8 aromatic ring structures. The pyrolysis oil 102 may also include other components, such as but not limited to saturated hydrocarbons. Referring to FIG. 2, the composition of a typical pyrolysis oil 102 produced from steam cracking crude oil from Saudi Arabia is graphically depicted. As shown in FIG. 2, the pyrolysis oil 102 may include mono-aromatics, di-aromatics, tri-aromatics, tetra-aromatics, penta-aromatics, hexa-aromatics, and aromatic compounds having 7 or more aromatic rings (hepta & plus aromatics in FIG. 2). The pyrolysis oil 102 may include elevated concentrations of di-aromatic compounds and aromatic compounds having greater than or equal to 7 aromatic rings, as indicated by FIG. 2. In embodiments, the pyrolysis oil 102 that is rich in multi-ring aromatic compounds may include greater than or equal to 50 wt. % multi-ring aromatic compounds, such as greater than or equal to 60 wt. %, greater than or equal to 65 wt. %, greater than or equal to 70 wt. %, greater than or equal to 75 wt. %, or even greater than or equal to 80 wt. % multi-ring aromatic compounds based on a unit weight of the pyrolysis oil 102. The pyrolysis oil 102 may include greater than or equal to 30 wt. % multi-ring aromatic compounds having greater than or equal to sixteen carbon atoms, such as greater than or equal to 35 wt. %, greater than or equal to 40 wt. %, greater than or equal to 45 wt. %, greater than or equal to 50 wt. %, or even greater than or equal to 55 wt. % multi-ring aromatic compounds having greater than or equal to sixteen carbon atoms, based on the unit weight of the pyrolysis oil 102. The pyrolysis oil 102 may also have a low concentration of sulfur and sulfur compounds. The pyrolysis oil 102 may have a concentration of sulfur and sulfur-containing compounds of less than or equal to 500 parts per million by weight (ppmw), such as less than or equal to 400 ppmw, or even less than or equal to 300 ppmw.

The systems 100 and methods of the present disclosure may also be operable to upgrade other carbonaceous resources that are difficult to treat or other heavy oils, which may have substantial concentrations of multi-ring aromatic compounds. Other heavy oils may include, but are not limited to, oil sand bitumen and heavy oil residues.

In embodiments, the pyrolysis oil 102 may be diluted with toluene 103 prior to being passed to the pyrolysis upgrading unit 110. Due to the high viscosity of the pyrolysis oil 102, toluene 103 may be added as a diluent to increase the fluidity of the pyrolysis oil 102. The addition of toluene 103 to the pyrolysis oil 102 may allow the pyrolysis oil 102 to have increased contact with the surfaces of the mixed metal oxide catalyst 106. The pyrolysis oil 102 and toluene 103 may be mixed at a weight ratio of pyrolysis oil 102 to toluene 103 of from 95/5 to 65/35.

Referring again to FIG. 1, the pyrolysis oil 102 may be passed to the pyrolysis upgrading unit 110. The pyrolysis upgrading unit 110 may be operable to contact the pyrolysis oil 102 with hydrogen 104 in the presence of the mixed metal oxide catalyst 106 to produce a reaction effluent 114. Contacting the pyrolysis oil 102 with hydrogen 104 in the presence of the mixed metal oxide catalyst 106 may convert multi-ring aromatic compounds having greater than or equal to sixteen carbon atoms in the pyrolysis oil 102 to light aromatic compounds. The hydrogen 104 may include a recycled hydrogen stream or supplemental hydrogen from an external hydrogen source inside or outside the battery limits of the refinery. The hydrogen 104 may be passed directly to the pyrolysis upgrading unit 110 or may be combined with the pyrolysis oil 102 upstream of the pyrolysis upgrading unit 110. The hydrogen 104 may be used to pressurize the pyrolysis upgrading unit 110 to the operating pressure.

The pyrolysis upgrading unit 110 may include any type of reactor suitable for contacting the pyrolysis oil 102 with hydrogen 104 in the presence of the mixed metal oxide catalyst 106. Suitable reactors may include, but are not limited to, batch reactors, fixed bed reactors, moving bed reactors, continuous stirred tank reactors, plug flow reactors, thick liquid attitude bed reactors, boiling-bed reactors, or combinations of reactors. In embodiments, the pyrolysis upgrading unit 110 comprises one or a plurality of batch reactors.

The mixed metal oxide catalyst 106 may be operable to convert multi-ring aromatic compounds having greater than or equal to sixteen carbon atoms in the pyrolysis oil 102 to light aromatic compounds. The mixed metal oxide catalyst 106 may include a plurality of catalyst particles. Each of the plurality of catalyst particles may include a plurality of metal oxides. The plurality of metal oxides of the mixed metal oxide catalyst 106 may include oxides of metals in groups 3-13 of the International Union of Pure and Applied Chemistry (IUPAC) periodic table. In embodiments, the plurality of metal oxides of the mixed metal oxide catalyst 106 may include oxides of iron, zirconium, cerium, aluminum, tungsten, molybdenum, titanium, or combinations of these. The mixed metal oxide catalyst 106 may also include oxides of metalloids, such as oxides of silicon. The mixed metal oxide catalyst 106 may comprise oxides of metals or metalloids selected from the group consisting of iron oxide ($Fe_2O_3$), zirconium oxide ($ZrO_2$), cerium oxide ($CeO_2$), aluminum oxide (alumina) ($Al_2O_3$), silica ($SiO_2$), tungsten oxide ($WO_3$), molybdenum oxide ($MoO_3$), titanium oxide ($TiO_2$), and combinations of these.

The mixed metal oxide catalyst 106 may include iron oxide as one of the plurality of metal oxides. In embodiments, the mixed metal oxide catalyst 106 may include from 60 wt. % to 95 wt. % iron oxide, such as from 70 wt. % to 90 wt. %, from 75 wt. % to 85 wt. %, or from 80 wt. % to 85 wt. % iron oxide. The mixed metal oxide catalyst 106 may include zirconium oxide as one of the plurality of metal oxides. In embodiments, the mixed metal oxide catalyst 106 may include from 1 wt. % to 20 wt. % zirconium oxide, such as from 1 wt. % to 15 wt. %, from 2.5 wt. % to 12.5 wt. %, or from 5 wt. % to 10 wt. % zirconium oxide. The mixed metal oxide catalyst 106 may include cerium oxide as one of the plurality of metal oxides. In embodiments, the mixed metal oxide catalyst 106 may include from 0.1 wt. % to 10 wt. % cerium oxide, such as from 0.5 wt. % to 7.5 wt. %, from 0.5 wt. % to 5 wt. %, or from 1 wt. % to 5 wt. %. The mixed metal oxide catalyst 106 may include aluminum oxide (alumina) as one of the plurality of metal oxides. In embodiments, the mixed metal oxide catalyst 106 may include from 1 wt. % to 20 wt. % aluminum oxide (alumina), such as from 2.5 wt. % to 15 wt. %, from 3 wt. % to 12.5 wt. %, or from 5 wt. % to 10 wt. %. The weight percentages of the plurality of metal oxides of the mixed metal oxide catalyst 106 are based on the total weight of the mixed metal oxide catalyst 106. The mixed metal oxide catalyst 106 may comprise, consist of, or consist essentially of from 60 wt. % to 95 wt. % iron oxide, from 1 wt. % to 20 wt. % zirconium oxide, from 0.1 wt. % to 10 wt. % cerium oxide, and from 1 wt. % to 20 wt. % aluminum oxide (alumina). In embodiments, the mixed metal oxide catalyst 106 may include 83 wt. % iron oxide, 7.5 wt. % zirconium oxide, 2.5 wt. % cerium oxide, and 7.0 wt. % aluminum oxide (alumina).

Contacting the pyrolysis oil 102 with hydrogen 104 in the presence of the mixed metal oxide catalyst 106 at the reaction conditions may convert at least a portion of the multi-ring aromatic compounds in the pyrolysis oil 102 to the light aromatic compounds in a single step, without conducting a subsequent chemical reaction step. Converting di-aromatic and multi-ring aromatic compounds to light aromatic compounds, such as benzene, toluene, ethylbenzene, and xylenes, is a complicated reaction scheme comprising multiple synchronized and selective reactions, which may include selective hydrogenation of one aromatic ring in a compound but not all, subsequent ring opening of the saturated naphthenic ring, hydro-dealkylation, transalkylation, and disproportionation reactions. Not intending to be bound by any particular theory, it is believed that upgrading pyrolysis oil 102 may include selective hydrogenation of at least one aromatic ring structure or a multi-ring aromatic compound to produce a molecule with one or more aromatic rings and at least one saturated ring. The saturated ring portion may then undergo ring opening to produce a substituted aromatic compound. The substituted aromatic may then undergo one or more of hydroalkylation, transalkylation, or disproportionation to produce light aromatic compounds. It is understood that multiple variations and combinations of these reactions as well as other chemical reactions may occur during the upgrading process. This complex sequence of synchronized reactions for upgrading pyrolysis oil 102 may be catalyzed using the mixed metal oxide catalyst 106.

The pyrolysis upgrading unit 110 may contact the pyrolysis oil 102 with hydrogen 104 in the presence of the mixed metal oxide catalyst 106 at operating conditions sufficient to cause at least a portion of multi-ring aromatic compounds in the pyrolysis oil 102 to be upgraded to produce a reaction effluent 114, where the reaction effluent 114 comprises light aromatic compounds. The pyrolysis upgrading unit 110 may be operated at an operating temperature in the range of from 300 degrees Celsius (° C.) to 500° C., such as from 350° C. to 500° C., from 400° C. to 500° C., from 450° C. to 500° C., from 350° C. to 450° C., or from 400° C. to 450° C., and an operating pressure of from 1 megapascal (MPa) (10 bar) to 20 MPa (200 bar), such as from 3 MPa (30 bar) to 18 MPa (180 bar) or from 5 MPa (50 bar) to 16 MPa (160 bar). The weight ratio of mixed metal oxide catalyst 106 to pyrolysis oil 102 in the reactor may range from 0.1 to 1, such as from 0.1 to 0.6, 0.3 to 1.0, or from 0.3 to 0.6.

Contacting the pyrolysis oil 102 with hydrogen 104 in the presence of the mixed metal oxide catalyst 106 at the operating conditions of the pyrolysis upgrading unit 110 may cause at least a portion of multi-ring aromatic compounds in the pyrolysis oil 102 to undergo multiple synchronized and selective reactions to form light aromatic compounds. Contacting the pyrolysis oil 102 with hydrogen 104 in the presence of the mixed metal oxide catalyst 106 may result in a yield of greater than or equal to 30 wt. % light aromatic compounds, such as greater than or equal to 35 wt. %, greater than or equal to 40 wt. %, greater than or equal to 45 wt. %, or greater than or equal to 50 wt. % light aromatic compounds, based on the total weight of the reaction effluent 114.

The pyrolysis upgrading unit 110 may include one or more vapor outlets operable to pass gaseous constituents out of the pyrolysis upgrading unit 110 as a gaseous constituent effluent 112. The one or more vapor outlets may be operable to separate the gaseous constituent effluent 112 from the reaction effluent 114 after contacting the pyrolysis oil 102 with hydrogen 104 in the presence of the mixed metal oxide 106. The gaseous constituents of the gaseous constituent effluent 112 may include, but are not limited to, excess hydrogen 104, light hydrocarbons (e.g., methane, ethane, etc.), sulfur components (e.g., hydrogen sulfide ($H_2S$)), or combinations of these. The gaseous constituent effluent 112 may include at least 90%, at least 95%, at least 98%, at least 99%, or even at least 99.9% by weight of the gaseous constituents produced in the pyrolysis upgrading unit 110 after upgrading the pyrolysis oil 102, where the gaseous constituents generally refers to compounds that are gases at the reaction conditions in the pyrolysis upgrading unit 110. The gaseous constituent effluent 112 may also include excess hydrogen 104. The gaseous constituent effluent 112 may be passed to one or more downstream treatment processes, such as but not limited to processes for recovering any light aromatic compounds from the gaseous constituent effluent 112, separation of excess hydrogen, removal of one or more contaminants, or other processes.

The pyrolysis upgrading unit 110 may be in fluid communication with the separation unit 120 to pass the reaction effluent 114 from the pyrolysis upgrading unit 110 to the separation unit 120. The reaction effluent 114 may comprise light aromatic compounds. The light aromatic compounds may include aromatic hydrocarbons having six to thirteen carbon atoms. For example, the light aromatic compounds may include benzene, toluene, ethylbenzene, xylene, or combinations of these. The reaction effluent 114 may include at least 90%, at least 95%, at least 98%, at least 99%, or even at least 99.9% by weight of the light aromatic compounds produced in the pyrolysis upgrading unit 110. The reaction effluent 114 may also include the mixed metal oxide catalyst 106 and any unreacted constituents of the pyrolysis oil 102, such as unreacted heavy aromatic compounds.

Referring again to FIG. 1, the reaction effluent 114 may be passed to the separation unit 120. The separation unit 120 may be directly downstream of the pyrolysis upgrading unit 110 so that the reaction effluent 114 can be passed directly from the pyrolysis upgrading unit 110 to the separation unit 120 without passing through any intervening reactors or unit operations. The separation unit 120 may include one or a plurality of separation units. The separation unit 120 may be operable to separate the reaction effluent 114 into at least the reaction product effluent 122 and used mixed metal oxide catalyst 124. The separation unit 120 may include a solid-liquid separation device operable to separate the reaction effluent 114 into at least one reaction product effluent 122 and the used mixed metal oxide catalyst 124. In embodiments, the separation unit 120 may include a centrifuge. The separation unit 120 may be operable to separate the reaction effluent 114 by centrifugation into at least the reaction product effluent 122 and the used mixed metal oxide catalyst 124.

Although the separation unit 120 is depicted in FIG. 1 as separating the reaction effluent 114 into a reaction product effluent 122 comprising light aromatic compounds and the used mixed metal oxide catalyst 124, it is understood that the separation unit 120 may be operable to separate the reaction effluent 114 into a plurality of reaction product effluents, one or more of which may include light aromatic compounds. In embodiments, the separation unit 120 may include a distillation unit or fractionation unit downstream of the solid-liquid separation unit. The distillation unit or fractionation unit may be operable to separate the reaction product effluent 122 into a plurality for reaction product effluents. The reaction product effluent 122 may be passed to one or more downstream processes for further separation, treatment, or processing.

Referring now to FIG. 3, the system 100 may include a used catalyst treatment unit 230 downstream from the separation unit 120. Contacting the pyrolysis oil 102 with hydrogen 104 in the presence of the mixed metal oxide catalyst 106 at the reaction conditions may produce a condensate that may be deposited on the mixed metal oxide catalyst 106. Used mixed metal oxide catalyst 124 may be produced when the condensate is deposited on the mixed metal oxide catalyst 106. The used catalyst treatment unit 230 may be operable to regenerate used mixed metal oxide catalyst 124. The used catalyst treatment unit 230 may be operable to wash the used mixed metal oxide catalyst 124 with toluene 228 to remove at least a portion of the condensate from the used mixed metal oxide catalyst 124. Excess toluene 234 from the used catalyst treatment unit 230 may be passed out of the used catalyst treatment unit 230 and combined with the reaction product effluent 122.

The used catalyst treatment unit 230 may also be operable to vacuum dry the used mixed metal oxide catalyst 124 after washing. The used catalyst treatment unit 230 may be operable to vacuum dry the used mixed metal oxide catalyst 124 first at a temperature of from 20° C. to 30° C. and second at a temperature greater than 80° C. The used catalyst treatment unit 230 may also be operable to calcine the used mixed metal oxide catalyst 124 to produce a treated mixed metal oxide catalyst 232. In embodiments, the used catalyst treatment unit 230 may calcine the used mixed metal oxide catalyst 124 in air at a temperature of greater than 400° C. for six or more hours. The treated mixed metal oxide catalyst 232 may be passed out of the used catalyst treatment unit 230 and used back in the pyrolysis upgrading unit 110 as the mixed metal oxide catalyst 106.

Referring again to FIG. 1, a method for upgrading pyrolysis oil 102 may include contacting the pyrolysis oil 102 with hydrogen 104 in the presence of a mixed metal oxide catalyst 106 at reaction conditions to produce a reaction effluent 114 comprising light aromatic compounds. As previously described in the present disclosure, contacting the pyrolysis oil 102 with hydrogen 104 in the presence of the mixed metal oxide catalyst 106 at the reaction conditions may convert at least a portion of the multi-ring aromatic compounds in the pyrolysis oil 102 to light aromatic compounds. The reaction conditions may include a temperature of from 200° C. to 500° C., a pressure of from 1 MPa (10 bar) to 20 MPa (200 bar), weight ratio of mixed metal oxide catalyst 106 to pyrolysis oil 102 in the reactor may range from 0.1 to 1, or combinations of these reaction conditions.

The method may include contacting the pyrolysis oil 102 with hydrogen 104 in the presence of the mixed metal oxide catalyst 106 in a pyrolysis upgrading unit 110 to produce the reaction effluent 114. The pyrolysis upgrading unit 110 may have any of the features, catalysts, or operating conditions previously discussed in this disclosure for the pyrolysis upgrading unit 110. The method may also include separating the reaction effluent 114 in the separation unit 120 to produce the at least one reaction product effluent 122 and the used mixed metal oxide catalyst 124. The separation unit 120 may have any of the features, catalysts, or operating conditions previously discussed in this disclosure for the separation unit 120.

The method may include washing and drying the used mixed metal oxide catalyst 124. The used mixed metal oxide catalyst 124 may be washed with toluene 228 to remove at least a portion of the condensate from the used mixed metal oxide catalyst 124. It is contemplated that the used mixed metal oxide catalyst 124 may additionally or alternatively be washed with other solvents, such as, but not limited to, benzene, ethylbenzene, or xylenes to remove at least a portion of the condensate from the used mixed metal oxide catalyst 124. Washing and drying the used mixed metal oxide catalyst 124 may occur in the used catalyst treatment unit 230. The used catalyst treatment unit 230 may have any of the features, catalysts, or operating conditions previously discussed in this disclosure for the used catalyst treatment unit 230.

EXAMPLES

The various embodiments of methods and systems for the processing of heavy oils will be further clarified by the following examples. The examples are illustrative in nature, and should not be understood to limit the subject matter of the present disclosure.

Example 1: Mixed Metal Oxide Catalyst Preparation

To prepare a mixed metal oxide catalyst comprising iron oxide, zirconium oxide, cerium oxide, and aluminum oxide, 50 grams of iron(III) nitrate nonahydrate ($Fe(NO_3)_3 \cdot 9H_2O$) was dissolved in 800 mL of distilled water to make Solution A. Then, the other metal oxide precursors were added into Solution A. Specifically, 4.906 grams of aluminum nitrate nonahydrate ($Al(NO_3)_3 \cdot 9H_2O$), 1.549 grams of zirconium (IV) oxynitrate hydrate ($ZrO(NO_3)_2 \cdot 3 H_2O$), and 0.601 grams of cerium(III) nitrate hexahydrate ($Ce(NO_3)_3 \cdot 6H_2O$) were added into Solution A to form Solution B. Solution B was then stirred for thirty minutes.

An ammonia solution, Solution C, was prepared by adding 40 mL ammonium hydroxide ($NH_4OH$) (28-30% NH3 basis) in 60 mL distilled water. Solution C was added slowly into Solution B to produce Solution D. Solution C was added until the pH value of Solution D reached roughly 7. Solution D was then stirred for another hour.

After preparing Solution D and another hour of stirring, the precipitate was separated from Solution D and dried in an oven overnight (i.e., for about twelve hours). The dried precipitate was then calcined in air at 500° C. for two hours. After calcining, the dried and calcined precipitate was crushed to obtain the final mixed metal oxide catalyst.

Example 2: Upgrading Pyrolysis Oil in the Presence of a Mixed Metal Oxide Catalyst In Example 2, the performance of the mixed metal oxide catalyst of Example 1 for upgrading pyrolysis oil was evaluated. 16.74 grams of pyrolysis oil and 12.17 grams of the mixed metal oxide catalyst of Example 1 were added to a batch reactor and mixed. Before adding the pyrolysis oil, the pyrolysis oil was mixed with 4.37 grams of toluene as a diluent to increase the fluidity of the pyrolysis oil such that the pyrolysis oil could have full contact with the surface of the mixed metal oxide catalyst.

After adding the pyrolysis oil (with toluene) and mixed metal oxide catalyst to the batch reactor under atmospheric pressure and at room temperature, the batch reactor was sealed. The batch reactor was purged with pure hydrogen gas three times. The pressure was then increased to 140 bar (14 MPa) by introducing pure hydrogen gas at room temperature. The pyrolysis oil (with toluene) and mixed metal oxide catalyst were then heated to 400° C. and continuously stirred for four hours.

After the reaction, the bath reactor was cooled to room temperature. Then, the gas mixture was released and collected into a gas bag. The gas mixture was analyzed using gas chromatography. The reaction effluent was transferred to a separation unit (centrifuge). The reaction effluent was centrifuged at 10,000 revolutions per minute (rpm) for twenty minutes. Two layers were obtained after centrifuging, a top layer comprising the reaction product and a bottom layer comprising the used mixed metal oxide catalyst. The used mixed metal oxide catalyst was then washed with toluene to remove any condensate followed and vacuum dried. The used mixed metal oxide catalyst was vacuum dried at room temperature first and then at 100° C. The reaction product effluent was analyzed through simulated distillation (SIMDIS) gas chromatography, paraffins, isoparaffins, olefins, naphthenes, and aromatics (PIONA) gas chromatography, and high performance liquid chromatography (HPLC).

Table 1 provides the reaction conditions, characteristics of the pyrolysis oil, and characteristics of the reaction effluent.

TABLE 1

Reaction Conditions, Characteristics of Pyrolysis Oil, and Characteristics of Reaction Effluent

| Parameter | Value |
| --- | --- |
| Reaction Temperature (° C.) | 400 |
| Total Pressure Before Heating to Reaction Temperature (MPa) | 14 |
| Time on Stream (hours) | 4 |
| $C_{16}$ and $C_{16+}$ in Pyrolysis Oil (wt. %) | 41.3 |
| $C_{16}$ and $C_{16+}$ in Reaction Effluent (wt. %) | 0.5 |
| $C_{16}$ and $C_{16+}$ Conversion (%) | 98.8 |
| $H_2$ Conversion (%) | 33.5 |
| Gas Product Yield (wt. %) | 3.9 |
| Liquid Product Yield[1] (wt. %) | 96.1 |
| Mono-Aromatics ($C_6$-$C_9$) Yield (wt. %) | 41.3 |
| Di-Aromatics ($C_{10}$-$C_{13}$) Yield (wt. %) | 40.8 |
| Tri-Aromatics ($C_{14}$-$C_{16}$) Yield (wt. %) | 14.4 |
| Coke/Feed (%) | 0 |

[1]Toluene diluent was not considered as a product.

As shown in Table 1, the mixed metal oxide catalyst was effective to convert 98.8 percent of the tetra-aromatics ($C_{16}$ and $C_{16+}$ hydrocarbons) in the pyrolysis oil to mono-aromatics, di-aromatics, or tri-aromatics in a single step. Notably, the liquid product yield includes 41.3 wt. % mono-aromatics and 40.8 wt. % di-aromatics.

One or more aspects of the present disclosure are described herein. A first aspect of the present disclosure may include a method for upgrading pyrolysis oil comprising contacting the pyrolysis oil with hydrogen in the presence of a mixed metal oxide catalyst at reaction conditions to produce a reaction effluent comprising light aromatic compounds. The pyrolysis oil may comprise multi-ring aromatic compounds. The mixed metal oxide catalyst may comprise a plurality of catalyst particles and each of the plurality of catalyst particles may comprise a plurality of metal oxides. Contacting the pyrolysis oil with hydrogen in the presence of the mixed metal oxide catalyst at the reaction conditions may convert at least a portion of the multi-ring aromatic compounds in the pyrolysis oil to the light aromatic compounds.

A second aspect of the present disclosure may include the first aspect, in which the pyrolysis oil may comprise greater than or equal to 30 weight percent (wt. %) multi-ring aromatic compounds having greater than or equal to sixteen carbon atoms based on the total weight of the pyrolysis oil.

A third aspect of the present disclosure may include either the first aspect or the second aspect, comprising contacting the pyrolysis oil with hydrogen in the presence of the mixed metal oxide catalyst in a pyrolysis upgrading unit to produce the reaction effluent.

A fourth aspect of the present disclosure may include any one of the first through third aspects, comprising contacting the pyrolysis oil with hydrogen in the presence of the mixed metal oxide catalyst at a temperature of from 300 degrees Celsius (° C.) to 500° C.

A fifth aspect of the present disclosure may include any one of the first through fourth aspects, comprising contacting the pyrolysis oil with hydrogen in the presence of the mixed metal oxide catalyst at a pressure of from 1 MPa (10 bar) to 20 MPa (200 bar).

A sixth aspect of the present disclosure may include any one of the first through fifth aspects, in which the plurality of metal oxides of the mixed metal oxide catalyst comprise oxides of metals in groups 3-13 of the IUPAC periodic table.

A seventh aspect of the present disclosure may include any one of the first through sixth aspects, in which the plurality of metal oxides of the mixed metal oxide catalyst may comprise oxides of iron, zirconium, cerium, aluminum, tungsten, molybdenum, titanium, or combinations of these.

An eighth aspect of the present disclosure may include the seventh aspect, in which the mixed metal oxide catalyst may comprise from 60 wt. % to 95 wt. % iron oxide, from 1 wt. % to 20 wt. % zirconium oxide, from 0.1 wt. % to 10 wt. % cerium oxide, and from 1 wt. % to 20 wt. % aluminum oxide, where the weight percentages are based on the total weight of the mixed metal oxide catalyst.

A ninth aspect of the present disclosure may include any one of the first through eighth aspects, where the light aromatic compounds may comprise aromatic hydrocarbons having six to thirteen carbon atoms.

A tenth aspect of the present disclosure may include any one of the first through ninth aspects, where the light aromatic compounds may comprise benzene, toluene, ethylbenzene, xylene, or combinations of these.

An eleventh aspect of the present disclosure may include any one of the first through tenth aspects, where contacting the pyrolysis oil with hydrogen in the presence of the mixed metal oxide catalyst at the reaction conditions may convert the portion of the multi-ring aromatic compounds in the pyrolysis oil to the light aromatic compounds in a single step, without conducting a subsequent chemical reaction step.

A twelfth aspect of the present disclosure may include any one of the first through eleventh aspects, where contacting the pyrolysis oil with hydrogen in the presence of the mixed metal oxide catalyst may result in a yield of greater than or equal to 30 wt. % light aromatic compounds based on the total weight of the reaction effluent.

A thirteenth aspect of the present disclosure may include any one of the first through twelfth aspects, further comprising mixing the pyrolysis oil with toluene prior to contacting the pyrolysis oil with hydrogen in the presence of the mixed metal oxide catalyst.

A fourteenth aspect of the present disclosure may include the thirteenth aspect, comprising mixing the pyrolysis oil and toluene at a weight ratio of pyrolysis oil to toluene of from 95/5 to 65/35.

A fifteenth aspect of the present disclosure may include any one of the first through fourteenth aspects, further comprising separating a gaseous constituent from the reaction effluent after contacting the pyrolysis oil with hydrogen in the presence of the mixed metal oxide to yield a liquid portion of the reaction effluent.

A sixteenth aspect of the present disclosure may include any one of the first through fifteenth aspects, further comprising separating used mixed metal oxide catalyst in the liquid portion of the reaction effluent to yield a reaction product comprising light aromatic compounds.

A seventeenth aspect of the present disclosure may include the sixteenth aspect, comprising separating the used mixed metal oxide catalyst in the liquid portion of the reaction effluent in a separation unit to yield the reaction product.

An eighteenth aspect of the present disclosure may include either the sixteenth aspect or the seventeenth aspect, where the separation unit may comprise a centrifuge.

A nineteenth aspect of the present disclosure may include any one of the first through eighteenth aspects, further comprising washing and drying the used mixed metal oxide catalyst.

A twentieth aspect of the present disclosure may include the nineteenth aspect, where contacting the pyrolysis oil with hydrogen in the presence of the mixed metal oxide catalyst at the reaction conditions may produce a condensate that may be deposited on the mixed metal oxide catalyst to produce the used mixed metal oxide catalyst, and the method may further comprise washing the used mixed metal oxide catalyst with toluene to remove at least a portion of the condensate from the used mixed metal oxide catalyst.

A twenty-first aspect of the present disclosure may include either the nineteenth aspect or the twentieth aspect, comprising vacuum drying the used mixed metal oxide catalyst first at a temperature of from 20° C. to 30° C. and second at a temperature greater than 80° C.

A twenty-second aspect of the present disclosure may include a system for upgrading pyrolysis oil comprising a pyrolysis upgrading unit comprising a mixed metal oxide catalyst. The mixed metal oxide catalyst may comprise a plurality of catalyst particles and each of the plurality of catalyst particles may comprise a plurality of metal oxides. The pyrolysis upgrading unit may be operable to contact the pyrolysis oil with hydrogen in the presence of the mixed metal oxide catalyst to produce a reaction effluent. The system may also include a separation unit disposed downstream of the pyrolysis upgrading unit. The separation unit may be operable to separate used mixed metal oxide catalyst from the reaction effluent to produce a reaction product comprising light aromatic compounds.

A twenty-third aspect of the present disclosure may include the twenty-second aspect, in which the pyrolysis upgrading unit is operable to contact the pyrolysis oil with hydrogen in the presence of a mixed metal oxide catalyst at a temperature of from 300° C. to 500° C. and a pressure of from 1 MPa (10 bar) to 20 MPa (200 bar), to produce the reaction effluent.

A twenty-fourth aspect of the present disclosure may include either the twenty-second aspect or the twenty-third aspect, in which the separation unit is directly downstream of the pyrolysis upgrading unit.

A twenty-fifth aspect of the present disclosure may include any one of the twenty-second through twenty-fourth aspects, in which the separation unit comprises a centrifuge.

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A method for upgrading pyrolysis oil, the method comprising;
   contacting the pyrolysis oil with hydrogen in the presence of a mixed metal oxide catalyst at reaction conditions to produce a reaction effluent comprising light aromatic compounds, where:
      the pyrolysis oil comprises multi-ring aromatic compounds;

the mixed metal oxide catalyst comprises:
from 60 wt. % to 95 wt. % iron oxide;
from 1 wt. % to 20 wt. % zirconium oxide;
from 0.1 wt. % to 10 wt. % cerium oxide; and
from 1 wt. % to 20 wt. % aluminum oxide,
where the weight percentages are based on the total weight of the mixed metal oxide catalyst; and
contacting the pyrolysis oil with hydrogen in the presence of the mixed metal oxide catalyst at the reaction conditions converts at least a portion of the multi-ring aromatic compounds in the pyrolysis oil to the light aromatic compounds.

2. The method of claim 1, in which the pyrolysis oil comprises greater than or equal to 30 weight percent (wt. %) multi-ring aromatic compounds having greater than or equal to sixteen carbon atoms based on the total weight of the pyrolysis oil.

3. The method of claim 1, where contacting the pyrolysis oil with hydrogen in the presence of the mixed metal oxide catalyst at the reaction conditions converts the portion of the multi-ring aromatic compounds in the pyrolysis oil to the light aromatic compounds in a single step, without conducting a subsequent chemical reaction step.

4. The method of claim 1, further comprising separating a gaseous constituent from the reaction effluent after contacting the pyrolysis oil with hydrogen in the presence of the mixed metal oxide to yield a liquid portion of the reaction effluent.

5. The method of claim 1, comprising contacting the pyrolysis oil with hydrogen in the presence of the mixed metal oxide catalyst at a temperature of from 300 degrees Celsius (° C.) to 500° C.

6. The method of claim 1, comprising contacting the pyrolysis oil with hydrogen in the presence of the mixed metal oxide catalyst at a pressure of from 1 megapascal (MPa) (10 bar) to 20 MPa (200 bar).

7. The method of claim 1, where the light aromatic compounds comprise aromatic hydrocarbons having six to thirteen carbon atoms.

8. The method of claim 1, where the light aromatic compounds comprise benzene, toluene, ethylbenzene, xylene, or combinations of these.

9. The method of claim 1, where contacting the pyrolysis oil with hydrogen in the presence of the mixed metal oxide catalyst results in a yield of greater than or equal to 30 wt. % light aromatic compounds based on the total weight of the reaction effluent.

10. The method of claim 1, further comprising mixing the pyrolysis oil with toluene prior to contacting the pyrolysis oil with hydrogen in the presence of the mixed metal oxide catalyst.

11. The method of claim 10, comprising mixing the pyrolysis oil and toluene at a weight ratio of pyrolysis oil to toluene of from 95/5 to 65/35.

12. The method of claim 1, further comprising separating used mixed metal oxide catalyst in the liquid portion of the reaction effluent to yield a reaction product comprising light aromatic compounds.

13. The method of claim 12, comprising separating the used mixed metal oxide catalyst in the liquid portion of the reaction effluent in a separation unit to yield the reaction product.

14. The method of claim 12, where the separation unit comprises a centrifuge.

15. The method of claim 12, further comprising washing and drying the used mixed metal oxide catalyst.

16. The method of claim 15, where contacting the pyrolysis oil with hydrogen in the presence of the mixed metal oxide catalyst at the reaction conditions produces a condensate that may be deposited on the mixed metal oxide catalyst to produce the used mixed metal oxide catalyst, and the method further comprises washing the used mixed metal oxide catalyst with toluene to remove at least a portion of the condensate from the used mixed metal oxide catalyst.

17. The method of claim 15, comprising vacuum drying the used mixed metal oxide catalyst first at a temperature of from 20° C. to 30° C. and second at a temperature greater than 80° C.

* * * * *